(12) United States Patent
Zhang et al.

(10) Patent No.: US 11,806,871 B2
(45) Date of Patent: Nov. 7, 2023

(54) FLEXIBLY-DRIVEN SMALL UNDERWATER ROBOT AND DRIVING METHOD THEREOF

(71) Applicant: ZHEJIANG UNIVERSITY, Hangzhou (CN)

(72) Inventors: Chunli Zhang, Hangzhou (CN); Yihong Han, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/183,136

(22) Filed: Mar. 13, 2023

(65) Prior Publication Data

US 2023/0286136 A1 Sep. 14, 2023

(30) Foreign Application Priority Data

Mar. 14, 2022 (CN) .......................... 202210246383.5

(51) Int. Cl.
*B25J 9/14* (2006.01)
*B25J 9/00* (2006.01)
*B63C 11/52* (2006.01)

(52) U.S. Cl.
CPC ............. *B25J 9/142* (2013.01); *B25J 9/0015* (2013.01); *B63C 11/52* (2013.01)

(58) Field of Classification Search
CPC ........ B25J 9/0015; B25J 9/1085; B25J 9/142; B25J 11/00; B63C 11/52; B63G 2008/002
See application file for complete search history.

(56) References Cited

FOREIGN PATENT DOCUMENTS

| CN | 101391650 A | 3/2009 | |
|----|----|----|----|
| CN | 101638144 A | 2/2010 | |
| CN | 202574604 U | 12/2012 | |
| CN | 108032307 A | 5/2018 | |
| CN | 113772053 A | 12/2021 | |
| CN | 113928522 A | 1/2022 | |
| DE | 10017104 A1 * | 10/2001 | ............ B25J 9/1075 |
| WO | WO-2020161441 A1 * | 8/2020 | .......... B25J 15/0616 |

* cited by examiner

*Primary Examiner* — Joseph Brown

(57) ABSTRACT

Disclosed are a flexibly-driven small underwater robot and a driving method thereof. The underwater robot provided by the invention comprises a driving module and a propelling module. Two propelling modules are designed at head and tail portions, and the driving module is arranged between the two propelling modules. A rib plate in the driving module comprises a carbon fiber plate matrix and a piezoelectric fiber sheet; and a shape of the carbon fiber plate matrix is optimized by width change and hole digging. The propelling modules comprise a head propelling module and a tail propelling module, and the head propelling module and the tail propelling module are both propelled through a one-way valve. According to the invention, two modes of the pre-compression rib plate are adjusted through the piezoelectric fiber sheet, so that a volume of an internal cavity is changed, and jet propelling is carried out.

8 Claims, 4 Drawing Sheets

FLEXIBLY-DRIVEN SMALL UNDERWATER ROBOT AND DRIVING METHOD THEREOF

CROSS REFERENCE TO RELATED APPLICATIONS

This application claims foreign priority of Chinese Patent Application No. 202210246383.5, filed on Mar. 14, 2022 in the China National Intellectual Property Administration, the disclosures of all of which are hereby incorporated by reference.

TECHNICAL FIELD

The present invention belongs to the field of underwater robots, and particularly relates to a flexibly-driven small underwater robot and a driving method thereof.

BACKGROUND OF THE PRESENT INVENTION

At present, rigidly-driven underwater robots at home and abroad usually have two modes, which are namely propeller driving and hinged rigid connection respectively. Although these two driving modes have the advantages of simple structure and easy control in large-scale driving structures, these two driving modes have the disadvantages of low energy utilization, low flexibility and high noise when applied to small underwater robots. Low energy utilization means poor endurance. As an important factor of underwater detection, too large noise leads to more easy exposure to passive sonar detection. As a core of rigid driving, a motor drives a transmission mechanism to drive, which also reduces a flexibility of a machine. Moreover, with the increase of a number of transmission mechanisms, the structure of the underwater robots is complicated, and manufacturing and maintenance costs of the underwater robots are increased.

Therefore, in order to improve the driving efficiency, reduce the driving noise and increase the invisibility of the small underwater robots, we adopt a flexible driving mode and propose a small underwater robot, which not only improves the energy utilization rate and reduces the movement noise, but also improves the accurate control ability of the robots, simplifies the structure, and reduces movement and maintenance costs of the robots.

SUMMARY OF PRESENT INVENTION

In order to find a driving method of an underwater robot with high efficiency, low noise, simple structure and accurate control, the present invention provides a flexibly-driven small underwater robot and a driving method thereof.

The flexibly-driven small underwater robot comprises a main body part, a driving module and a skin. The driving module comprises a plurality of rib plates; the rib plates surround the main body part; and two ends of the rib plate are respectively fixed with two ends of the main body part. In an initial state, the rib plate is in a convex or concave pre-bent state. The annular and elastic skin is wrapped on outer sides of all the plurality of rib plates, and a water pumping and draining chamber is formed in a middle portion of the main body part. A head end of the main body part is provided with a water inlet, and a tail end of the main body part is provided with a water outlet; and the water inlet and the water outlet are both communicated with the water pumping and draining chamber. The water inlet and the water outlet are both provided with a one-way valve; an input port of the one-way valve on the water inlet is arranged outwardly; an input port of the one-way valve on the water outlet is arranged inwardly; and the rib plate comprises a piezoelectric sheet and a matrix plate. Two ends of one side surface of the matrix plate are both fixed with the piezoelectric sheet. When electrified, the piezoelectric sheet is extended or retracted along a length direction of the matrix plate. When the piezoelectric sheet is applied with forward and inverse voltage periodic voltages, corresponding rib plates are periodically switched between the concave state and the convex state to drive a volume of the water pumping and draining chamber to be changed periodically.

Preferably, the main body part comprises a head propelling module, a connecting module and a tail propelling module which are sequentially arranged and fixedly connected together.

Preferably, the head propelling module comprises a fairing, ahead platform, a water inlet pipe and a head skin adhesive portion which are fixed together. The fairing is partially spherical; and the head platform is arranged on an inner side of the fairing. The head skin adhesive portion is located on an outer side surface of the head platform and connected with corresponding edge of an inner side surface of the skin. The water inlet pipe is arranged in a central position of an outer side surface of the fairing and communicated with the water pumping and draining chamber. The tail propelling module comprises a tail platform, a one-way valve, a water outlet pipe and a tail skin adhesive portion. The tail skin adhesive portion is located on an outer side surface of the tail platform and connected with corresponding edge of the inner side surface of the skin. The water outlet pipe is arranged in a central position of an outer side surface of the tail platform and communicated with the water pumping and draining chamber. Edges of opposite side surfaces of the head platform and the tail platform are both provided with a plurality of inserting slots; and the inserting slots are connected with end portions of corresponding connecting rib plates in an inserted manner. A joint between the connecting rib plate and the inserting slot is adhered. A depth direction of the inserting slot is perpendicular to the opposite side surfaces of the head platform and the tail platform; and interiors or end portions of the water inlet pipe and the water outlet pipe are provided with the one-way valves.

Preferably, the one-way valve comprises a diversion pipe, a valve cover and a connecting shaft. An edge of an end portion of the diversion pipe and an edge of the valve cover are rotatably connected through the connecting shaft; a torsion spring is arranged between the valve cover and the diversion pipe; and under a condition of not being subjected to an acting force of a water flow, the valve cover abuts against the end portion of the diversion pipe under an elastic force provided by the torsion spring. The diversion pipe is closed when the valve cover abuts against the end portion of the diversion pipe. The valve cover in the one-way valve corresponding to the water inlet is located at one end of the diversion pipe close to the water pumping and draining chamber. The valve cover in the one-way valve corresponding to the water outlet is located at one end of the diversion pipe far away from the water pumping and draining chamber.

Preferably, the rib plates are evenly distributed along a circumferential direction of a central axis of the main body part.

Preferably, in the initial state, the rib plate is in the convex state; and two piezoelectric sheets in the rib plate are respectively located at two ends of an outer side surface of the matrix plate.

Preferably, in the initial state, the rib plate is in the concave state; and two piezoelectric sheets in the rib plate are respectively located at two ends of an inner side surface of the matrix plate.

Preferably, an inner side surface of the skin is adhered to outer side surfaces of the rib plates. Two ends of the skin are hermetically connected with two ends of the main body part by adhering.

Preferably, the matrix plate has a gradually changed width structure with two narrow ends and a wide middle. The matrix plate is provided with a hole in a position where the piezoelectric sheet is mounted.

A driving method of the flexibly-driven small underwater robot is as follows:

all piezoelectric sheets are applied with a periodic voltage to control the rib plates to be switched periodically between the convex state and the concave state, so that the volume of the water pumping and draining chamber is changed periodically; when the volume of the water pumping and draining chamber is reduced, the water inlet located at the head end of the main body part sucks water from external environment; and when the volume of the water pumping and draining chamber is increased, the water outlet located at the tail end of the main body part ejects water to external environment, thus forming a propelling force.

The present invention has the beneficial effects as follows.

1. According to the present invention, the piezoelectric sheet is periodically extended and retracted, so that the rib plate is repeatedly switched between the concave state and the convex state to drive the robot to continuously carry out backward jet movement, so as to realize continuous forward movement of the robot, thus having a simple and reliable structure. In addition, the deformation of the rib plate of the present invention refers to a sudden change beyond a critical point, which can quickly change the volume of the water draining chamber and producing a pulse jet backwardly, thus increasing a propelling force of the robot.

2. According to the present invention, an original rigid driving method is replaced, and a process of converting electric energy into mechanical energy of a motor and then converting the mechanical energy into whole kinetic energy of a machine is omitted, thus significantly improving the mechanical efficiency of the underwater robot, and being of great significance to the underwater robot technology.

3. According to the present invention, a flexible driving method is used, which produces less noise compared with the rigid driving method, so that it is more difficult for passive sonar detection of movement information in underwater movement, thus having higher concealment and safety.

4. According to the present invention, the used flexible driving method is simple in structure, convenient to manufacture and easy to maintain, thus reducing the manufacturing complexity of the underwater robot and reducing a maintenance cost.

5. According to the present invention, the used flexible driving method controlled by a piezoelectric material gives full play to the advantage of high sensitivity of the piezoelectric material, which is convenient for accurate control of a driving process, thus improving the flexibility of the machine.

DETAILED DESCRIPTION OF PREFERRED EMBODIMENTS

The present invention is further described hereinafter with reference to the drawings.

Embodiment 1

Figure 1:
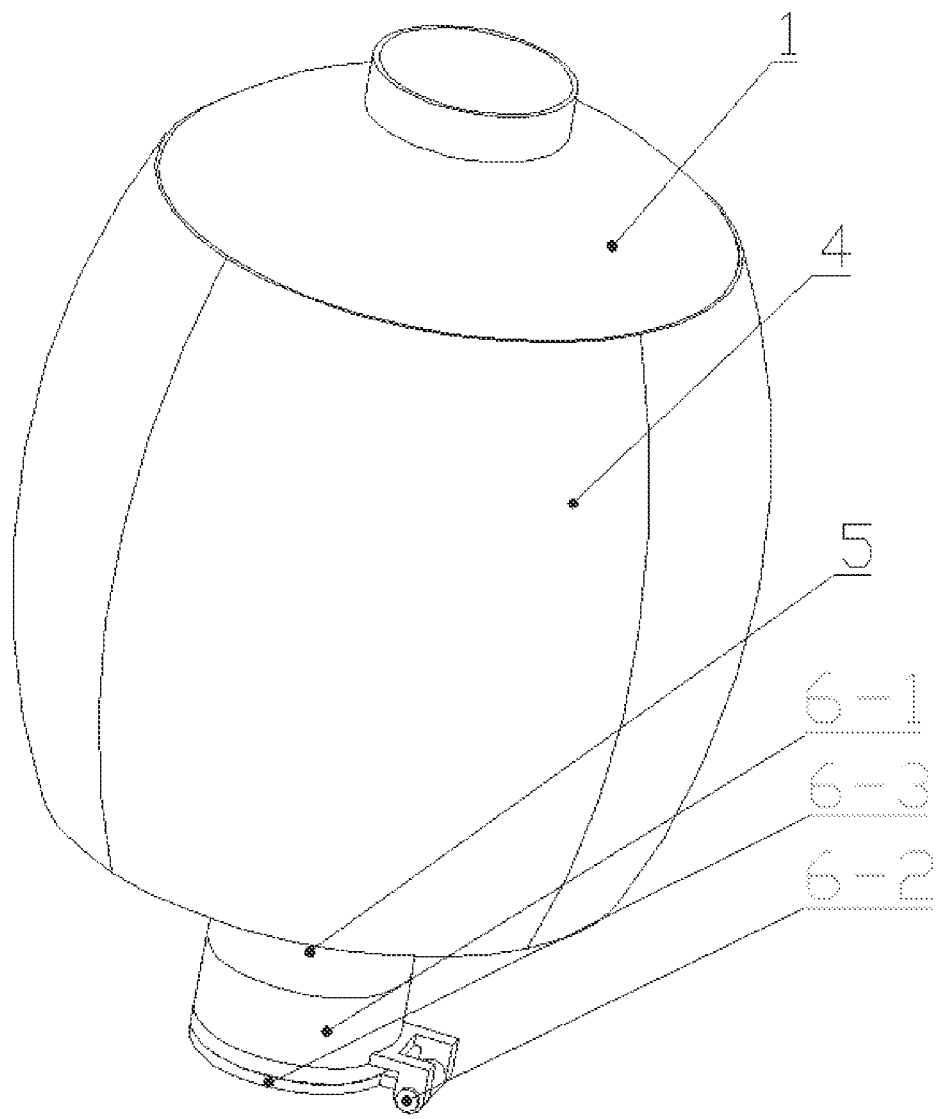
FIG. 1 is a schematic diagram of an overall structure of a small underwater robot provided by the present invention.
Figure 2:
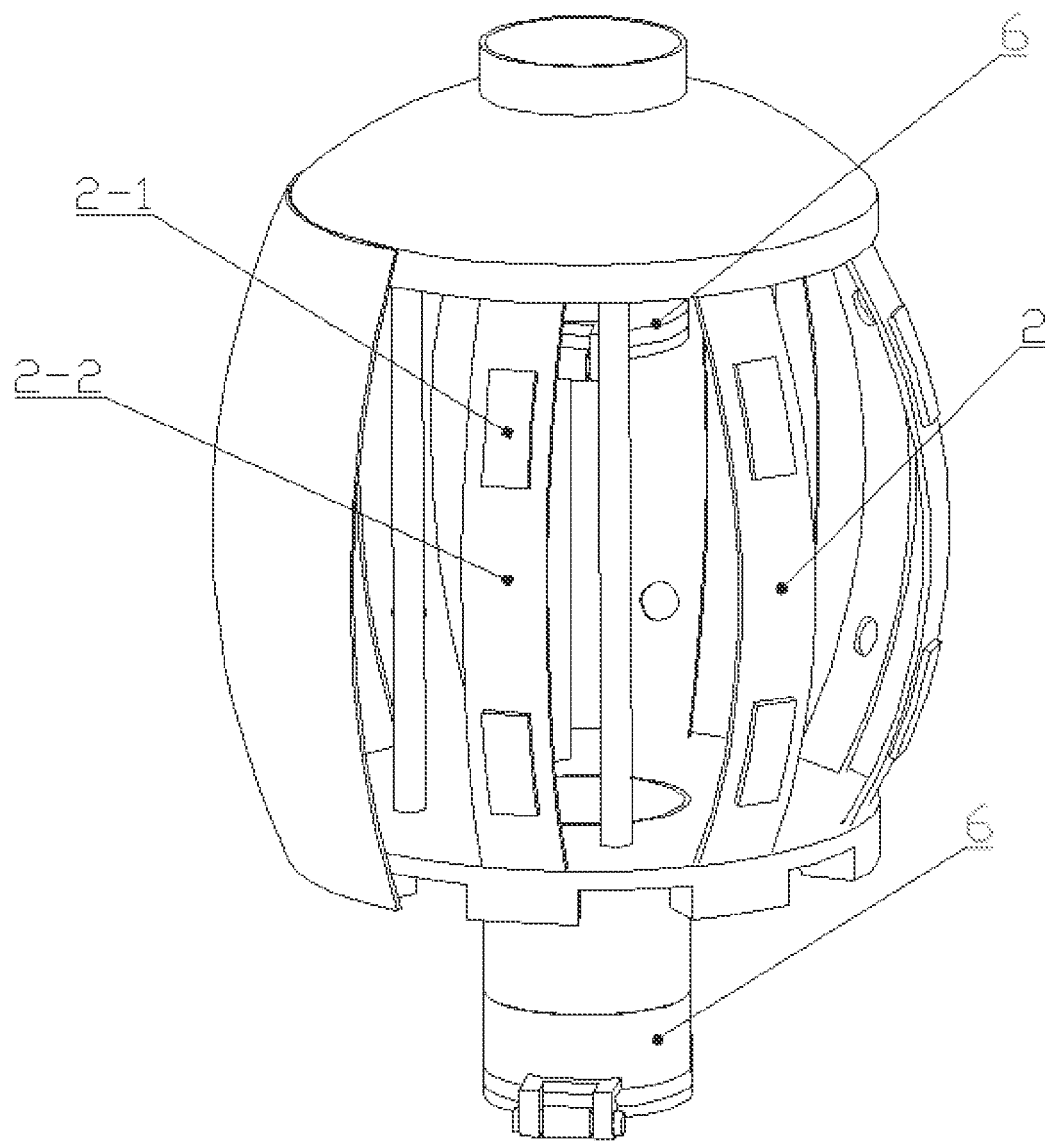
FIG. 2 is a schematic diagram of an internal structure of the small underwater robot provided by the present invention.
Figure 3:
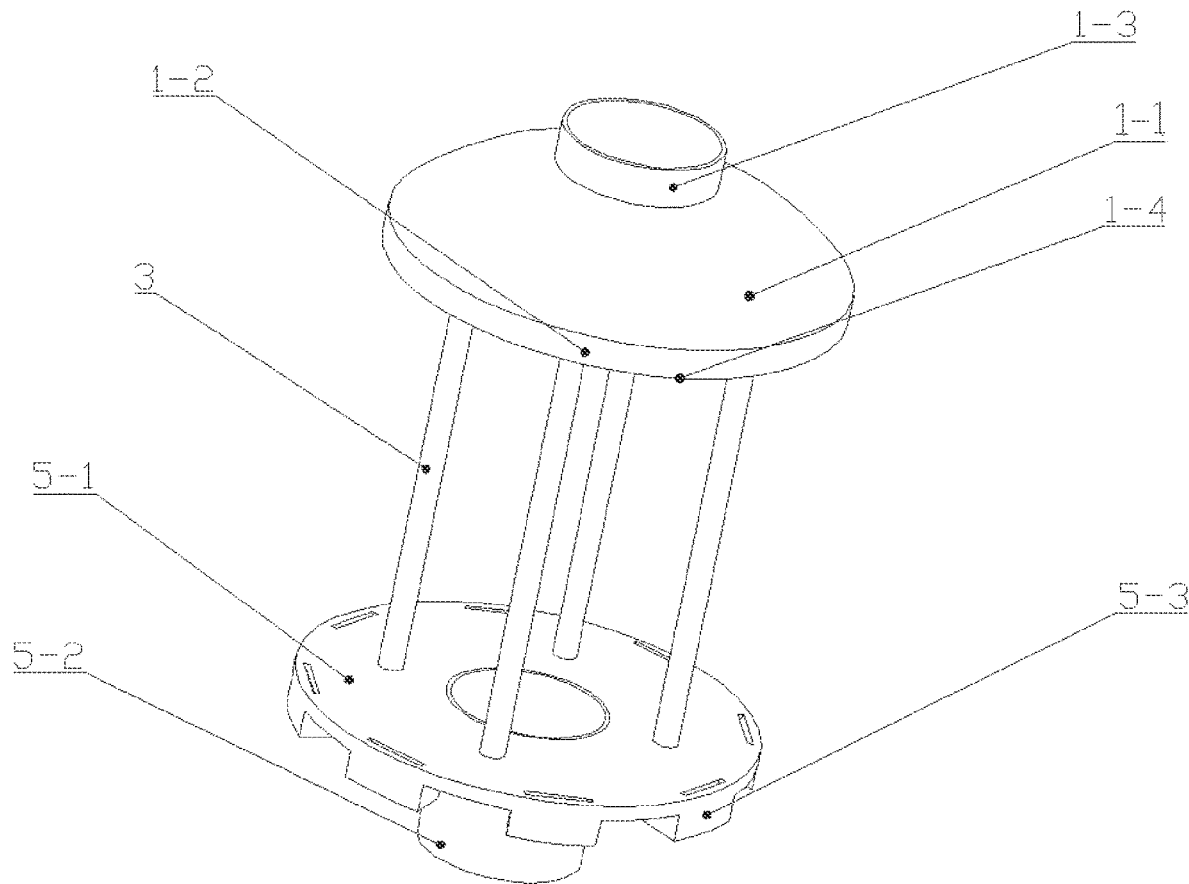
FIG. 3 is a schematic structural diagram of a main body part in the small underwater robot provided by the present invention.

As shown in FIG. 1, FIG. 2 and FIG. 3, a flexibly-driven small underwater robot comprises a main body part, a driving module 2 and a skin 4. The main body part comprises a head propelling module 1, a connecting module 3 and a tail propelling module 5.

The head propelling module 1, the connecting module 3 and the tail propelling module 5 are sequentially arranged, integrally designed, and all manufactured by integral printing through a 3D printer, with a material of PLA (polylactic acid) and a filling rate of 50%. A mounting sequence of the robot from inside to outside refers to an integral structure of head propelling module 1—connecting module 3—tail propelling module 5, the driving module 2 and the skin 4. The skin 4 is elastic and made of a material of PE (polyethylene). The connecting module 3 is a plurality of connecting rods. Two ends of the connecting rod are respectively fixed with opposite side surfaces of the head propelling module 1 and the tail propelling module 5, so that the head propelling module 1 and the tail propelling module 5 are fixed together, with a constant distance. Two ends of the driving module 2 are respectively connected with the head propelling module 1 and the tail propelling module 5 through an inserting slot; the skin 4 is adhered to an outer side of the driving module 2; and edges at two ends of the skin 4 are respectively adhered to edges at inner ends of the head propelling module 1 and the tail propelling module 5 to maintain a sealing performance. Therefore, an interior of the whole skin is a cavity, and a machine moves through a change of a volume of the cavity.

Figure 4:
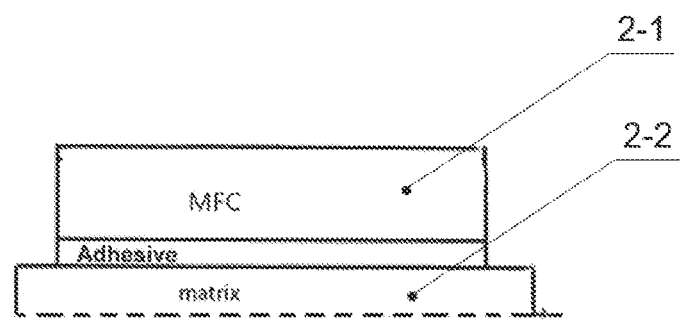
FIG. 4 is a schematic diagram of a layered structure of a rib plate in the small underwater robot provided by the present invention.

As shown in FIG. 4, the driving module 2 comprises a plurality of rib plates evenly distributed along a circumferential direction of a central axis of the robot; and two ends of the rib plate are respectively fixed with the edges of the head propelling module 1 and the tail propelling module 5. A length of the rib plate is greater than the distance between the head propelling module 1 and the tail propelling module 5. In an initial state, a middle portion of the rib plate is in an outward pre-bent state. The annular skin 4 is wrapped on outer sides of all the plurality of rib plates to form a closed water pumping and draining chamber. When a volume of the water pumping and draining chamber is increased, the head propelling module 1 can suck water from external environment; and when the volume of the water pumping and draining chamber is reduced, the tail propelling module 5 can drain a water flow, thus forming a propelling force.

The rib plate comprises a piezoelectric sheet 2-1 and a matrix plate 2-2. The matrix plate 2-2 is a T300 twill matte matrix plate. The piezoelectric sheet 2-1 is a M2814-P1 piezoelectric fiber sheet. Two piezoelectric sheets 2-1 are adhered to the matrix plate 2-2 through an epoxy adhesive. The two piezoelectric sheets 2-1 are respectively arranged at two ends of an outer side surface of the rib plate. When the piezoelectric sheet 2-1 is electrified, a length of the piezoelectric sheet is increased, thus changing a stress on the outer side surface of the rib plate; and when an axial stress of the piezoelectric sheet 2-1 exceeds a threshold, a steady state of outward bending of the middle portion of the rib plate will be destroyed, so that the rib plate is suddenly changed from outward bending to inward bending, thus changing the volume of the water pumping and draining chamber (the volume of the water pumping and draining chamber is increased when the rib plate is changed from outward bending to inward bending, and the volume of the water pumping and draining chamber is reduced when the rib plate is changed from inward bending to outward bending).

In order to achieve a better promoting effect, the matrix plate 2-2 has a gradually changed width structure with two narrow ends and a wide middle; and the matrix plate 2-2 is provided with a hole in a position where the piezoelectric sheet 2-1 is mounted for adjusting an overall rigidity of the rib plate 2, thus improving an overall driving ability of the machine. The hole is a round hole. There are electrodes on the piezoelectric sheet 2-1; and the electrodes are connected to a signal generator through a high-voltage amplifier to realize voltage control of the piezoelectric sheet 2-1. The signal generator is connected with a power supply. The power supply is arranged inside the robot or outside the robot, and connected with the robot through a cable.

Figure 5:
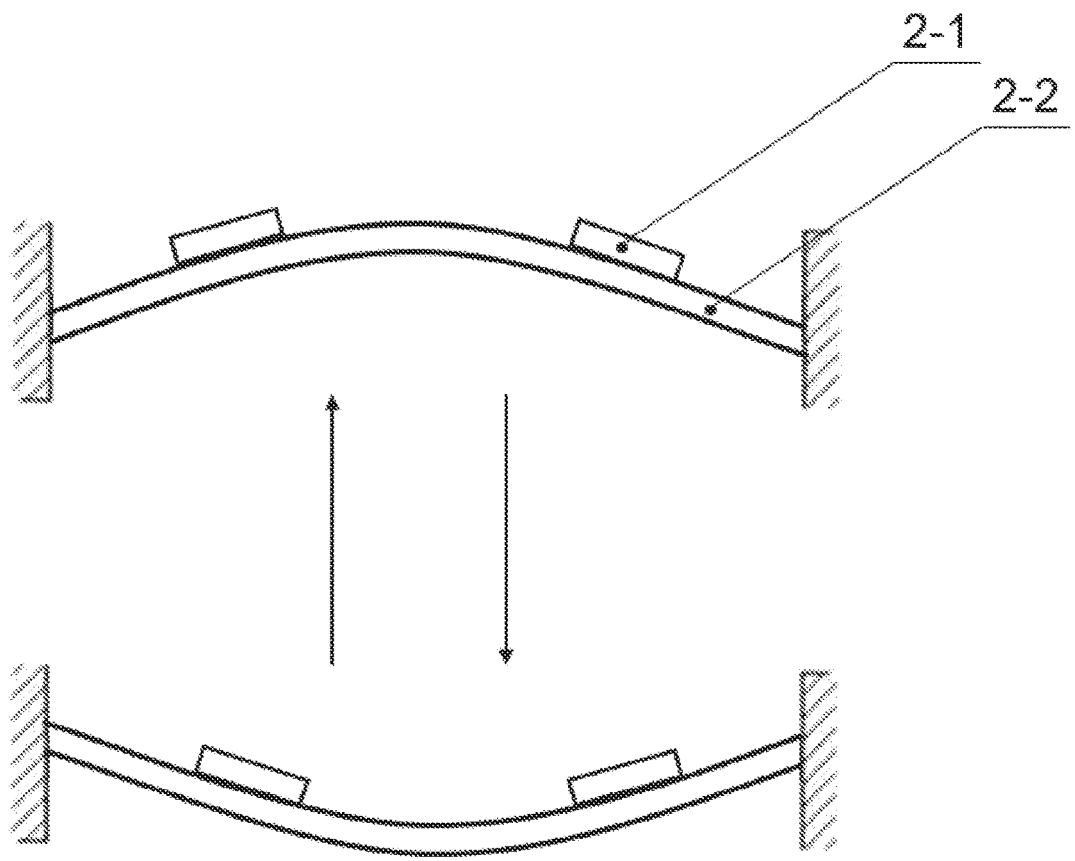
FIG. 5 is a principle diagram of the rib plate switched between a concave state and a convex state in the small underwater robot provided by the present invention.

As shown in FIG. 5, a principle of switching the rib plate between the inward bending and outward bending states is as follows: in the initial state, the rib plate is in a pre-compressed state in which the middle portion is convex; and when the piezoelectric sheet 2-1 is applied with a forward voltage, the piezoelectric sheet 2-1 is extended to provide an axial tension to the outer side surface of the rib plate. Since the piezoelectric fiber sheet has a certain angle with an axial direction of the robot, the axial tension may have a component along a radial direction of the robot, under an action of the component, the rib plate is equivalent to being pressed inwardly along the radial direction of the robot, and when the pressure exceeds a threshold, the rib plate will be switched from the convex state to the concave state. When the piezoelectric sheet 2-1 is applied with an inverse voltage, the piezoelectric sheet 2-1 is retracted to provide an axial pressure to the outer side surface of the rib plate, and a radial component of the axial pressure may promote the rib plate 2 to be switched from the concave state to the convex state.

As shown in FIG. 1, FIG. 2 and FIG. 3, the head propelling module 1 comprises a fairing 1-1, a head platform 1-4, a water inlet pipe 1-3 and a head skin adhesive portion 1-2 which are fixed together. The fairing 1-1 is partially spherical for reducing water flow resistance; and the head platform 1-4 is arranged on an inner side of the fairing 1-1. The head skin adhesive portion 1-2 is located on the outer side surface of the head platform 1-4 and is a joint between the skin 4 and the head platform 1-4. The water inlet pipe 1-3 is arranged in a central position of an outer side surface of the fairing 1-1 and communicated with the water pumping and draining chamber.

As shown in FIG. 1, FIG. 2 and FIG. 3, the tail propelling module 5 comprises a tail platform 5-1, a one-way valve 6, a water outlet pipe 5-2 and a tail skin adhesive portion 5-3. The tail skin adhesive portion 5-3 is located on an outer side surface of the tail platform 5-1 and is a joint between the skin 4 and the tail platform 5-1. The water outlet pipe 5-2 is arranged in a central position of an outer side surface of the tail platform 5-1 and communicated with the water pumping and draining chamber.

Edges of opposite side surfaces of the head platform 1-4 and the tail platform 5-1 are both provided with a plurality of inserting slots to be connected with end portions of the rib plates 2. A depth direction of the inserting slot is perpendicular to the opposite side surfaces of the head platform 1-4 and the tail platform 5-1; and after being inserted into the inserting slot, the rib plate is fixed through an epoxy resin adhesive to ensure a boundary condition that two ends of the rib plate are both fixedly supported. Interiors or end portions of the water inlet pipe 1-3 and the water outlet pipe 5-2 are both provided with the one-way valves 6. The one-way valve 6 corresponding to the water inlet pipe 1-3 only allows water in external environment to enter the water pumping and draining chamber through the water inlet pipe 1-3. The one-way valve 6 corresponding to the water outlet pipe 5-2 only allows water in the water pumping and draining chamber to be output to external environment through the water outlet pipe 5-2, so as to realize a jet flow providing a driving force.

The one-way valve 6 comprises a diversion pipe 6-1, a valve cover 6-3 and a connecting shaft 6-2. An edge of an end portion of the diversion pipe 6-1 and an edge of the valve cover 6-3 are rotatably connected through the connecting shaft 6-2; a torsion spring is arranged between the valve cover 6-3 and the diversion pipe 6-1; and under a condition of not being subjected to an acting force of a water flow, the valve cover 6-3 abuts against the end portion of the diversion pipe 6-1 under an elastic force provided by the torsion spring. The diversion pipe 6-1 is closed when the valve cover 6-3 abuts against the end portion of the diversion pipe 6-1.

The valve cover 6-3 in the one-way valve corresponding to the water inlet pipe 1-3 is located at one end of the diversion pipe 6-1 close to the water pumping and draining chamber, and can only be opened inwardly, so that the valve cover can only be automatically opened when water enters the water pumping and draining chamber. The valve cover 6-3 in the one-way valve corresponding to the water outlet pipe 5-2 is located at one end of the diversion pipe 6-1 far away from the water pumping and draining chamber, and can only be opened outwardly, so that the valve cover can only be automatically opened when water is drained from the water pumping and draining chamber.

Figure 6:
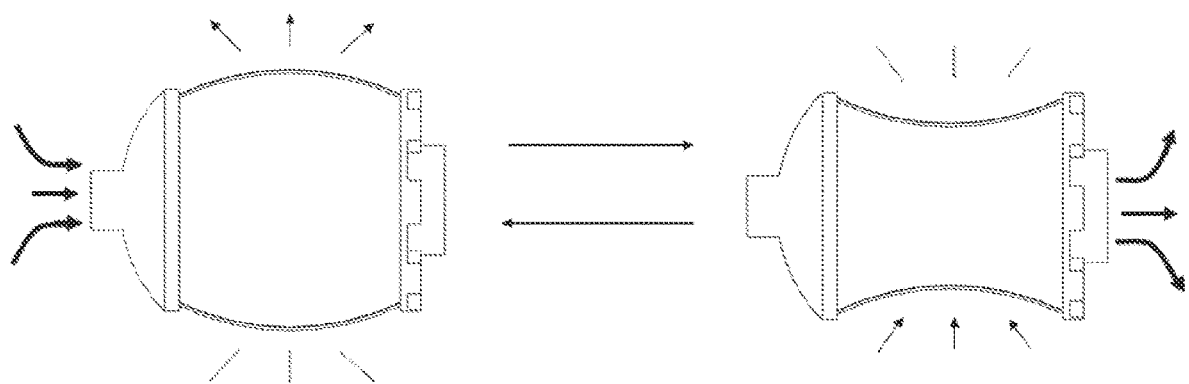
FIG. 6 is a schematic diagram of a movement process of the small underwater robot provided by the present invention.

A driving method of the flexibly-driven small underwater robot is as follows:

as shown in FIG. 6, the power supply is turned on, the signal generator and the high-voltage amplifier are connected and started, and the rib plate is controlled to be periodically switched between the convex and concave states by controlling a voltage signal to be periodically switched between positive and negative values, and then the skin is driven, so that the volume of the whole water pumping and draining chamber is changed periodically. When the volume of the water pumping and draining chamber is reduced, the water inlet pipe 1-3 located at the head end of the robot sucks water from external environment; and when the volume of the water pumping and draining chamber is increased, the water outlet pipe 5-2 located at the tail end of the robot ejects water to external environment, thus forming a propelling force. Therefore, the robot continuously moves forward. The robot may be steered by rotation of a fin or modes in other prior arts.

Embodiment 2

A flexibly-driven small underwater robot is provided, and this embodiment is different from Embodiment 1 in that: in the initial state, the rib plate is in the concave state. The piezoelectric sheet 2-1 is arranged on an inner side surface of the rib plate.

We claim:

1. A flexibly-driven small underwater robot, comprising a main body part, a driving module (2) and a skin (4), wherein the driving module (2) comprises a plurality of rib plates; the rib plates surround the main body part; two ends of the rib plates are respectively fixed with two ends of the main body part; in an initial state, the rib plates are in a convex or concave pre-bent state; the annular and elastic skin (4) is wrapped on outer sides of all the plurality of rib plates, and a water pumping and draining chamber is formed in a middle portion of the main body part; a head end of the main body part is provided with a water inlet, and a tail end of the main body part is provided with a water outlet; the water inlet and the water outlet are both communicated with the water pumping and draining chamber; the water inlet and the water outlet are both provided with a one-way valve; an input port of the one-way valve on the water inlet is arranged outwardly; an input port of the one-way valve on the water outlet is arranged inwardly; the rib plates comprise a piezoelectric sheet (2-1) and a matrix plate (2-2); two ends of one side surface of the matrix plate (2-2) are both fixed with the piezoelectric sheet (2-1); when electrified, the piezoelectric sheet (2-1) is extended or retracted along a length direction of the matrix plate (2-2); and when the piezoelectric sheet (2-1) is applied with forward and inverse periodic voltages, corresponding rib plates are periodically switched between the concave state and the convex state to drive a volume of the water pumping and draining chamber to be changed periodically; and the main body part comprises a head propelling module (1), a connecting module (3) and a tail propelling module (5) which are sequentially arranged and fixedly connected together; and the matrix plate (2-2) has a gradually changed width structure with two narrow ends and a wide middle; and the matrix plate (2-2) is provided with a hole in a position where the piezoelectric sheet (2-1) is mounted.

2. The flexibly-driven small underwater robot according to claim 1, wherein the head propelling module (1) comprises a fairing (1-1), a head platform (1-4), a water inlet pipe (1-3) and a head skin adhesive portion (1-2) which are fixed together; the fairing (1-1) is partially spherical; the head platform (1-4) is arranged on an inner side of the fairing (1-1); the head skin adhesive portion (1-2) is located on an outer side surface of the head platform (1-4) and connected with a corresponding edge of an inner side surface of the skin (4); the water inlet pipe (1-3) is arranged in a central position of an outer side surface of the fairing (1-1) and communicated with the water pumping and draining chamber; the tail propelling module (5) comprises a tail platform (5-1), the one-way valve (6), a water outlet pipe (5-2) and a tail skin adhesive portion (5-3); the tail skin adhesive portion (5-3) is located on an outer side surface of the tail platform (5-1) and connected with a corresponding edge of the inner side surface of the skin (4); the water outlet pipe (5-2) is arranged in a central position of an outer side surface of the tail platform (5-1) and communicated with the water pumping and draining chamber; edges of opposite side surfaces of the head platform (1-4) and the tail platform (5-1) are both provided with a plurality of inserting slots; the inserting slots are connected with end portions of corresponding rib plates in an inserted manner; a joint between the rib plate and the inserting slot is adhered; a depth direction of the inserting slot is perpendicular to the opposite side surfaces of the head platform (1-4) and the tail platform (5-1); and interiors or end portions of the water inlet pipe (1-3) and the water outlet pipe (5-2) are provided with the one-way valves (6).

3. The flexibly-driven small underwater robot according to claim 1, wherein the one-way valve (6) corresponding to the water outlet comprises a diversion pipe (6-1), a valve cover (6-3) and a connecting shaft (6-2); an edge of an end portion of the diversion pipe (6-1) and an edge of the valve cover (6-3) are rotatably connected through the connecting shaft (6-2); a torsion spring is arranged between the valve cover (6-3) and the diversion pipe (6-1); under a condition of not being subjected to an acting force of a water flow, the valve cover (6-3) abuts against the end portion of the diversion pipe (6-1) under an elastic force provided by the torsion spring; the diversion pipe (6-1) is closed when the valve cover (6-3) abuts against the end portion of the diversion pipe (6-1); the valve cover (6-3) in the one-way valve corresponding to the water inlet is located at one end of the diversion pipe (6-1) close to the water pumping and draining chamber; and the valve cover (6-3) in the one-way valve corresponding to the water outlet is located at one end of the diversion pipe (6-1) far away from the water pumping and draining chamber.

4. The flexibly-driven small underwater robot according to claim 1, wherein the rib plates are evenly distributed along a circumferential direction of a central axis of the main body part.

5. The flexibly-driven small underwater robot according to claim 1, wherein in the initial state, the rib plates are in the convex state; and the two piezoelectric sheets (2-1) in the rib plate are respectively located at two ends of an outer side surface of the matrix plate (2-2).

6. The flexibly-driven small underwater robot according to claim 1, wherein in the initial state, the rib plates are in the concave state; and the two piezoelectric sheets (2-1) in the rib plate are respectively located at two ends of an inner side surface of the matrix plate (2-2).

7. The flexibly-driven small underwater robot according to claim 1, wherein an inner side surface of the skin (4) is adhered to outer side surfaces of the rib plates; and two ends of the skin (4) are hermetically connected with two ends of the main body part by adhering.

8. A driving method of the flexibly-driven small underwater robot according to claim 1, wherein all piezoelectric sheets are applied with a periodic voltage to control the rib plates to be switched periodically between the convex state and the concave state, so that the volume of the water pumping and draining chamber is changed periodically; when the volume of the water pumping and draining chamber is reduced, the water inlet located at the head end of the main body part sucks water from an external environment; and when the volume of the water pumping and draining chamber is increased, the water outlet located at the tail end of the main body part ejects water to the external environment, thus forming a propelling force.

* * * * *